United States Patent
Faist et al.

(10) Patent No.: US 11,139,947 B2
(45) Date of Patent: Oct. 5, 2021

(54) METHOD FOR THE TIME-SYNCHRONIZED PROCESSING OF DATA OF A FIELD DEVICE OF PROCESS AUTOMATION

(71) Applicant: VEGA GRIESHABER KG, Wolfach (DE)

(72) Inventors: Fridolin Faist, Oberwolfach (DE); Martin Gaiser, Alpirsbach (DE); Andreas Isenmann, Haslach (DE)

(73) Assignee: Vega Grieshaber KG, Wolfach (DE)

( * ) Notice: Subject to any disclaimer, the term of this patent is extended or adjusted under 35 U.S.C. 154(b) by 53 days.

(21) Appl. No.: 16/055,048

(22) Filed: Aug. 4, 2018

(65) Prior Publication Data
US 2019/0140815 A1    May 9, 2019

(30) Foreign Application Priority Data

Aug. 31, 2017 (DE) .................... 10 2017 120 032.0

(51) Int. Cl.
| | |
|---|---|
| *H04L 7/00* | (2006.01) |
| *G05B 19/042* | (2006.01) |
| *G04G 7/00* | (2006.01) |
| *H04L 29/08* | (2006.01) |

(52) U.S. Cl.
CPC ............. *H04L 7/0016* (2013.01); *G04G 7/00* (2013.01); *G05B 19/042* (2013.01); *G05B 2219/25428* (2013.01); *H04L 67/10* (2013.01)

(58) Field of Classification Search
CPC .............................. H04L 7/0016; H04L 67/10
See application file for complete search history.

(56) References Cited

U.S. PATENT DOCUMENTS

| | | | |
|---|---|---|---|
| 2005/0108289 A1 | 5/2005 | East et al. | |
| 2008/0194934 A1* | 8/2008 | Ray ........................ | G16H 10/60 600/347 |
| 2008/0263105 A1 | 10/2008 | Nakamura | |
| 2013/0094372 A1* | 4/2013 | Boot ..................... | H04L 43/028 370/252 |
| 2013/0243220 A1* | 9/2013 | Watanabe ................ | H04R 3/12 381/97 |

FOREIGN PATENT DOCUMENTS

EP    2042957 A2    9/2008

OTHER PUBLICATIONS

GPTO search report for related application 102017120032.0, dated Jun. 11, 2018.

* cited by examiner

*Primary Examiner* — El Hadji M Sall
(74) *Attorney, Agent, or Firm* — William Gray Mitchell (57) ABSTRACT

A method for the time-synchronized processing of data of a field device of process automation, in which the data and/or data changes are saved together with an internal time stamp of an internal timer of the field device in a memory of the field device; during the reading process of the data from the field device, a path difference being detected of the internal timer of the field device and a timer of the control unit by which the data is read, the internal time stamps are corrected by the path difference, and are saved as corrected time stamps together with the data.

6 Claims, 7 Drawing Sheets

METHOD FOR THE TIME-SYNCHRONIZED PROCESSING OF DATA OF A FIELD DEVICE OF PROCESS AUTOMATION

CROSS REFERENCE TO RELATED APPLICATIONS

This patent application claims priority to German Patent Application 10 2017 120 032.0, filed on Aug. 31, 2017.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a method for the time-synchronized processing of data of a field device of process automation.

Background of the Invention

Field devices in process automation are frequently equipped with internal timers and/or a clock. Various field devices require such timers in order to trigger adjustable deadlines for certain actions, e.g. switching a relay, transmitting a message, or similar. Other field devices use the timer to allow saving a corresponding time stamp, for example when saving measurements or device information, e.g., historic data, recordings of parameters modified, or similar.

A known problem of the timers of field devices in process automation is given in their precision of time recording. Some field devices now offer the option to cyclically adjust the clock drift by comparing them with a reference clock using suitable communication protocols. Here, any drift is determined between a device-internal timer and a reference clock and, depending on the time offset being within predetermined tolerance values, a parameter is then set to "good" or "bad".

In the field of processing industry or also in general in the field of the Internet of Things (IoT) it becomes increasingly important that devices and particularly field devices collect diagnostic information. The gathering of information regarding historic data concerning measurements or the gathering of echo-curves in more complex measuring methods becomes also increasingly important for future analyses. In order to allow reasonable further processing, it may become necessary that also the temporal context can be traced, here, this means that a reliable time stamp must exist for the individual information.

Any cyclical subsequent correction of the timers of field devices, as described in prior art, can only occur when the respective infrastructure is provided for a time server, typically accessed via the internet. In field devices of the processing industry, this infrastructure is frequently not given.

The objective of the present invention is to further improve a method for the time-synchronized processing of data of a field device of process automation so that synchronization and processing can occur even without any additional infrastructure.

This objective is attained in a method showing the features of patent claim 1. Advantageous further developments are the objective of the dependent claims.

BRIEF SUMMARY OF THE INVENTION

In a preferred embodiment, a method for the time-synchronized processing of data of a field device (3) of process automation, in which the data and/or data changes are saved together with an internal time stamp of an internal timer (12) of the field device (3) in a memory (13, 16) of the field device (3), characterized in that when reading the data from the field device (3) a path difference ($\Delta t$) is detected between the internal timer (12) of the field device (3) and a timer (12) of a control unit (1), by which the data are read, the internal time stamp is corrected by the path difference ($\Delta t$), and saved as a corrected time stamp with said data.

In another preferred embodiment, the method as described herein, characterized in that measurements and/or parameter changes and/or diagnostics information are saved with the internal time stamp in the memory (13, 16) of the field device (3).

In another preferred embodiment, the method as described herein, characterized in that the control unit (1) reads the data via cyclical inquiries.

In another preferred embodiment, the method as described herein, characterized in that the control unit (1) saves the data together with the time stamp in a database.

In another preferred embodiment, the method as described herein, characterized in that the time stamp is converted by the control unit (1) to the universal time coordinated (UTC).

In another preferred embodiment, the method as described herein, characterized in that the data is forwarded by the reading device via a network (30) to a further processing system (31).

In another preferred embodiment, the method as described herein, characterized in that the further processing system represents a server (31), particularly a database server, on which the data are saved for further processing.

DETAILED DESCRIPTION OF THE INVENTION

A method according to the invention for synchronizing and processing data of a field device of process automation in which the data and/or data changes are saved together with an internal time stamp of an internal timer of the field device in a memory of said field device is characterized in that, upon reading the data from the field device, any clock drift between the internal timer of the field device and a timer of a control unit by which the data can be read is determined and the internal time stamp is corrected by said clock difference and saved as the corrected time stamp together with the data.

By the method according to the invention, it is possible, when reading saved data of a field device, to determine the existing clock drift in the field device and to correct all time-related information to the actually applicable time. Here, the clock of the control unit which scans the data is used as the time basis, thus for example that of a PC, laptop, tablet, or smart phone. The correction can then be used for immediate visualization or for saving the data for later processing. In this way, it is no longer necessary for the field device itself to provide permanently or at least cyclically a connection to a time server in a local network or the internet. Accordingly, a considerable simplification of the network requirements can be achieved.

The following method is particularly suited for measurements, parameter changes and diagnostics information. When these data can be saved with an internal time stamp in the memory of the field device, they can be synchronized and evaluated in reference to each other and also in reference to data of other measuring devices. In this way, it is also possible to analyze the effect of any changes at a field device, for example upon the measurements at a different measuring device.

A cyclical inquiry of the data by the control unit allows that additional analysis options are possible. With a so-called polling, the control unit can directly record the data, e.g. measurements or parameter changes of one or more field devices, and directly reference them to each other.

Advantageously, the control unit can save the data together with the time stamp in a database so that an immediate or subsequent analysis of the data is easily possible.

In order to yield data from various field devices that can be compared to each other, even when the field devices are used in different time zones, for example, it is beneficial for the control unit to convert the time stamp to the universal time coordinated (UTC).

The data can be processed directly by the control unit and/or forwarded via a network to a processing system.

The device-internal timer can be embodied as a real-time clock, for example.

DETAILED DESCRIPTION OF THE FIGURES

Figure 1:
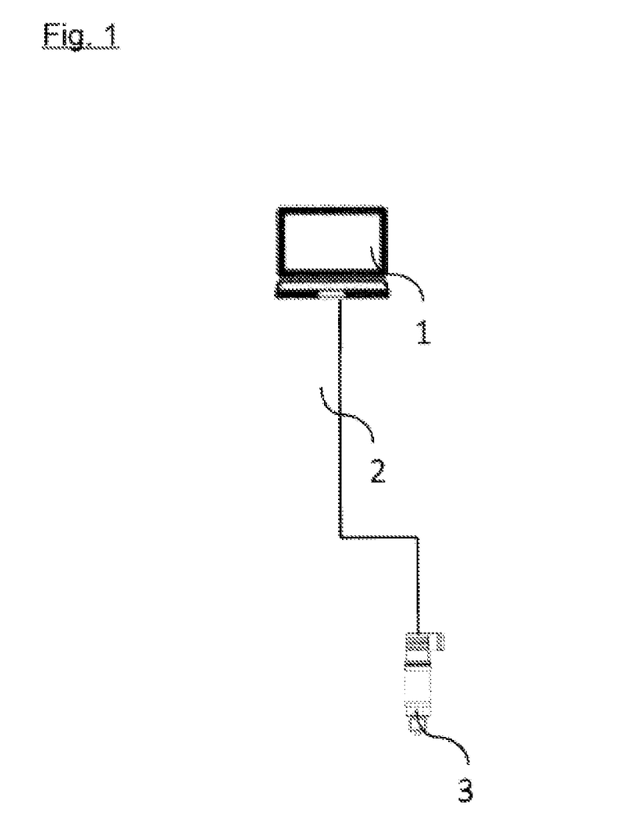
FIG. 1 is a line drawing evidencing a first design of a measuring arrangement with a direct connection between the field device and the control unit.

FIG. 1 shows a first design of a measuring arrangement with a direct connection between a field device 3 and a control unit 1.

In this design, the control unit 1, which for example may represent a PC, laptop, smart phone, tablet, or similar, shows a communication interface 2, via which it is connected to the field device 3. Using this connection, here parameter adjustments in the field device 3 can be carried out as well as measurements and diagnostics data scanned autonomously, which had been read from the field device 3. The communication interface 2 can be formed both as a wired as well as a wireless interface. A wireless communication interface can be embodied, for example, as a radio connection via Bluetooth, Wifi, LoRa, or similar. A Bluetooth connection represents an industrial standard according to IEEE 802.15.1 for data transmission via radio signals over short distances.

Here, Wifi, also known as wireless LAN (WLAN) according to IEEE 802.11, also refers to data transmissions via radio signals. This represents here the most common standard for data transmission via radio in office, home, and industrial settings. The LoRa network, also called Long Range Wide Area Network (LoRa-WAN), represents a standard of the LoRa Alliance. Here, both radio technology as well as protocol technology are defined.

Figure 2:
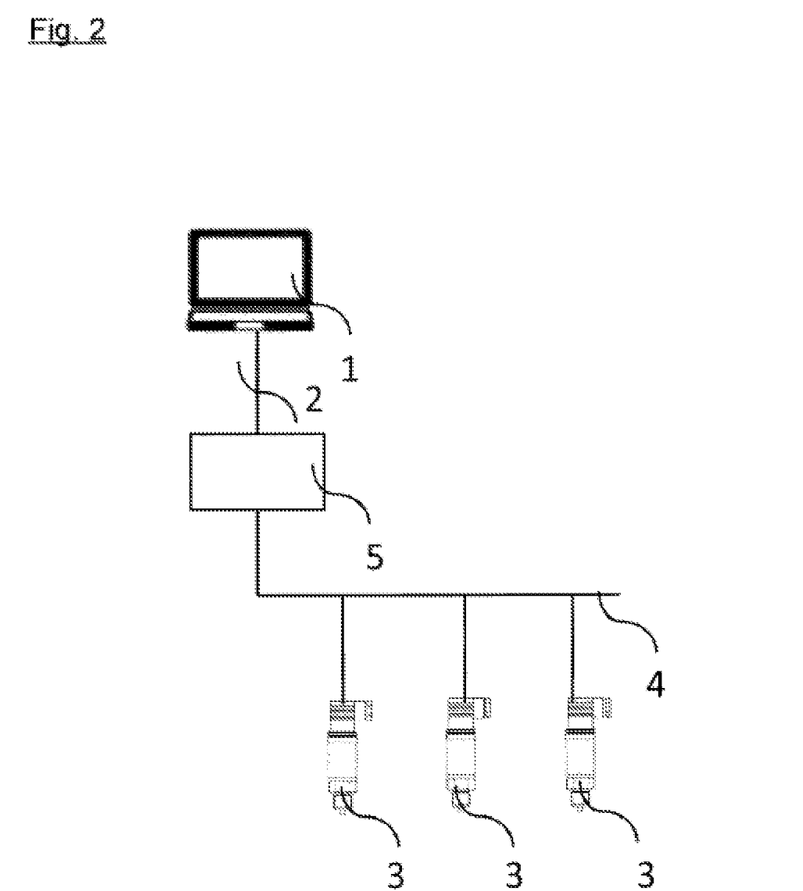
FIG. 2 is a line drawing evidencing a second design of a measuring arrangement with a field bus arrangement for connecting several field devices with the control unit.

FIG. 2 shows a respective design for an arrangement with several field devices 3, which are connected via a field bus 4 and a gateway 5 to the control unit 1.

Figure 3:
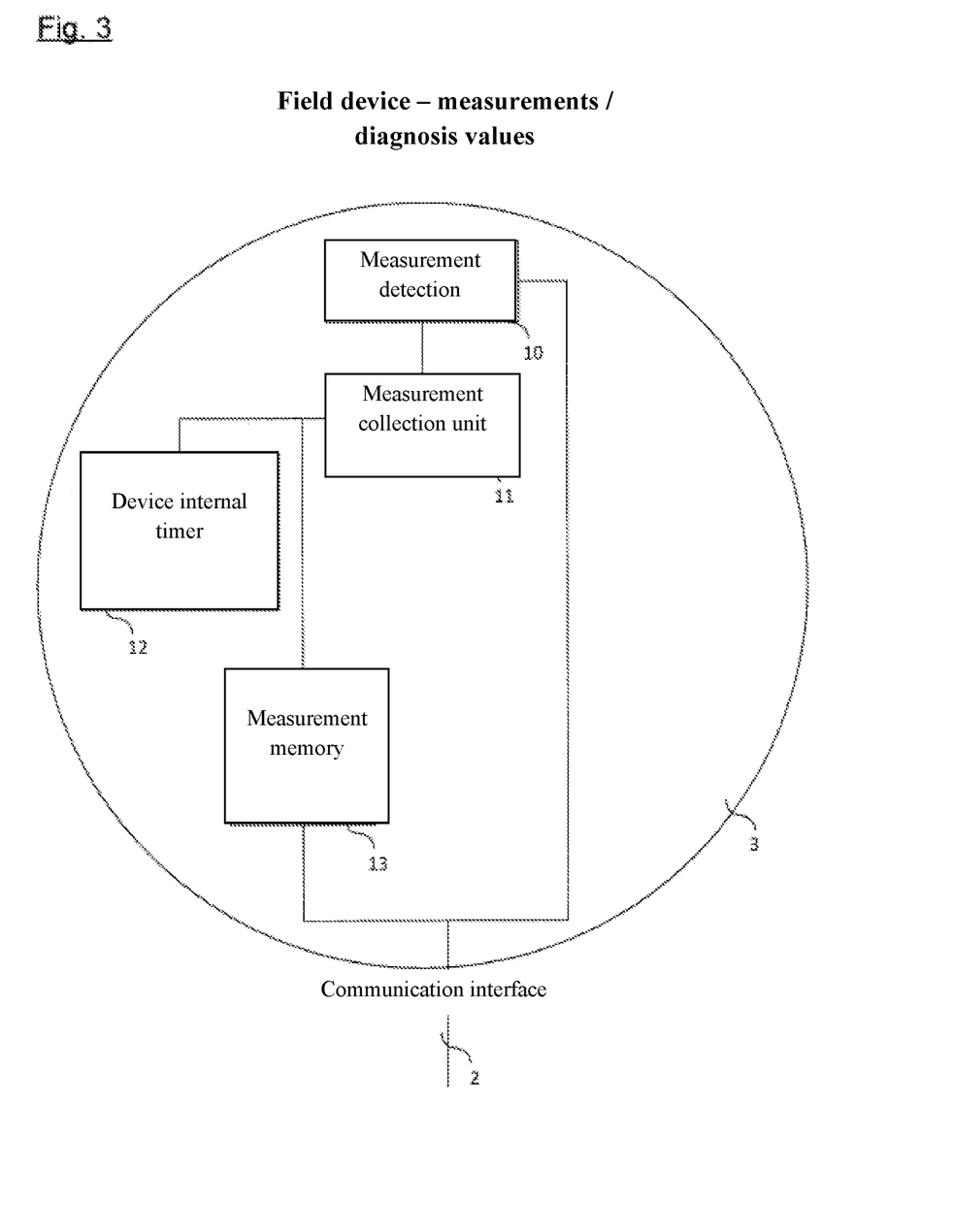
FIG. 3 is a line drawing evidencing a schematically, the functional blocks of a field device for detecting measurements.

FIG. 3 shows, schematically, the functional blocks of a field device 3 for detecting measurements.

The field device 3 may represent a device from the field of pressure measurements or fill-level measurement. Here, other measuring methods of processing industry are also possible. The main objective of these devices is typically the detection of a pressure and/or fill level measurement 10 and the subsequent forwarding of these values to superordinate devices via a communication interface 2 to control the procedures and/or to visualize the current measurements 10. Some field devices 3 further offer the autonomous collection of measurements 10 via a measurement collection unit 11 and a measurement memory 13. The time information required is here obtained from a device-internal timer 12. The data collected in the measurement memory 13 can then be recalled later via a control unit 1 using the communication interface 2 and subsequently used for further processing. It shall be mentioned here that the device-internal timer 12 is not permanently synchronized with a time server and thus is subsequently updated.

Figure 4:
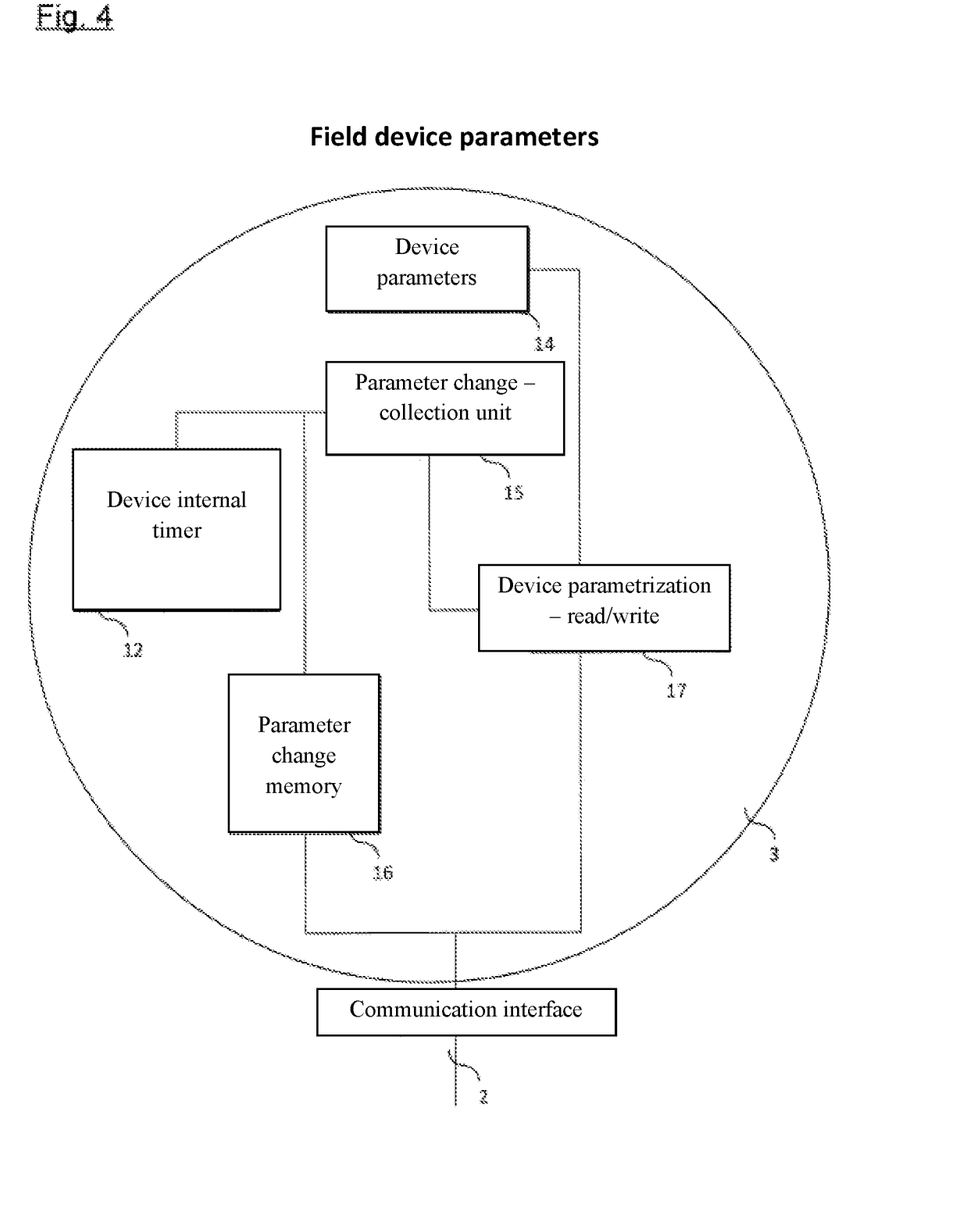
FIG. 4 is a line drawing evidencing a schematically, the functional blocks for parametrization of the field device according to FIG. 3.

FIG. 4 shows, schematically, the functional blocks of a field device 3 according to FIG. 3, in which further the parametrization 17 of the field device 3 is possible. Here, the control unit 1 can directly read the device parameters 14 via the communication interface 2, using the device parametrization 17. Writing processes of the device parameters 14 occur also via the device parametrization 17, with the writing processes additionally being registered by a parameter change—recording unit 15 and a parameter change memory 16. For each saved parameter, the corresponding time stamp of the device-internal timer 12 is saved as well. The data collected in the parameter change memory 16 can then later be recalled via the control unit 1 using the communication interface 2 and used for further processing.

The functional blocks of the FIGS. 3 and 4 can also be used in combinations or expanded by additional functional blocks. In both variants the individual data points show a time stamp which is taken from the device-internal timer.

According to FIG. 3, the current measurement can also be transferred directly from the measuring detection 10 via the communication interface 2 to a superordinate device, e. g. a control unit 1 using application software.

Figure 5:
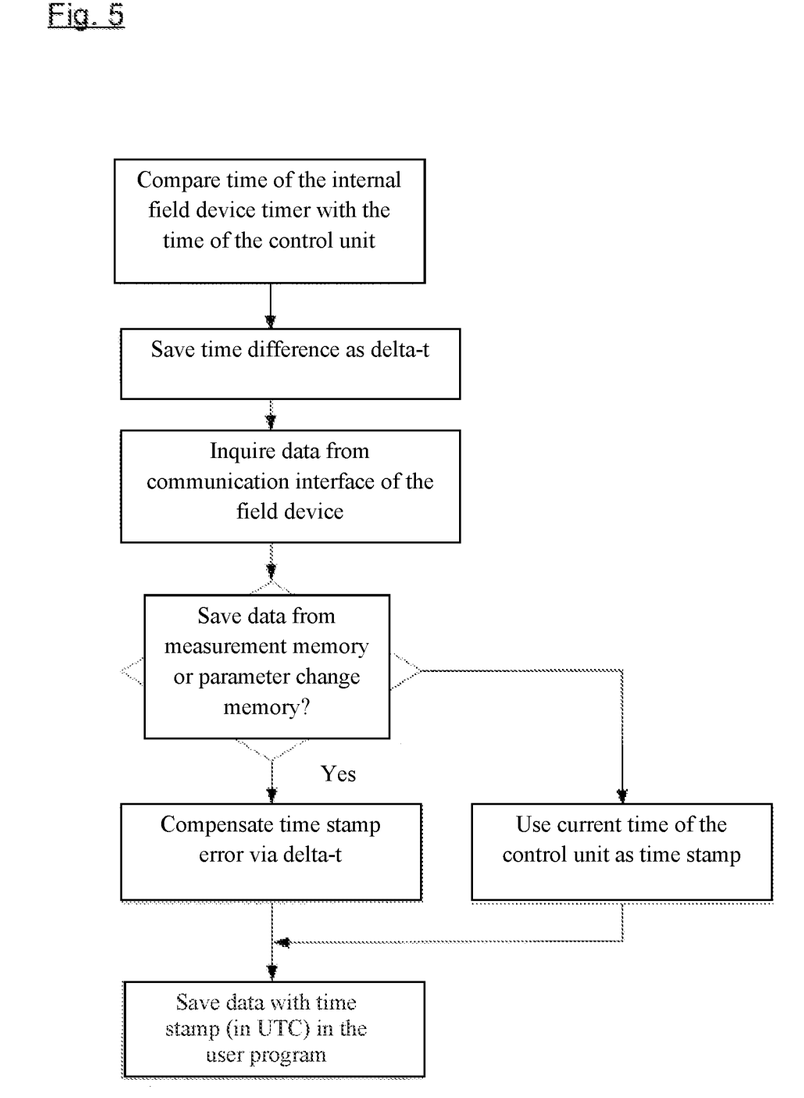
FIG. 5 is a line drawing evidencing the process of the method according to the present application.

This way, the application software, when reading measurements 10 from the field device 3 over an extended period of time, can generate a measurement memory 13 directly in the control unit 1. When reading measurements 10 in this so-called polling method, cyclically, for every data point the time stamp of the control unit 1 is used, in other words the PC or the smart phone. FIG. 5 describes the method that must be implemented in the control unit 1 according to the present application.

In a first step at the beginning of any connection between the field device 3 and the control unit 1, a clock drift is determined between an internal timer of the control unit 1 and the internal timer 12 of the field device 3. This clock drift, also called delta-t, is saved for the later compensation. During the subsequent recall of the data via the communication interface 2 of the field device 3, it is checked if the data to be recorded come from the measurement memory 13 or the parameter change memory 16 or are transmitted directly from the measurement detection 10. Depending on the type of data inquired, the further process is different:

Data from the measurement memory 13 of the field device 3 are saved with a time stamp corrected by the time stamp:

corrected time stamp=detected time stamp+delta-$t$

Data from the parameter change memory 16 of the field device 3 are saved with a path difference corrected by the time stamp:

corrected time stamp=detected time stamp+delta-$t$

Data from the current measurement detection 10 of the field device 3 is saved with the current time stamp of the control unit 1:

corrected time stamp=Time of the control unit

When saving the above-mentioned data, for example in order to forward them to different user programs, a standardization occurs to the universal time coordinated (UTC) using the following calculation:

time stamp(UTC)=corrected time stamp=time zone of the control unit

Figure 6:
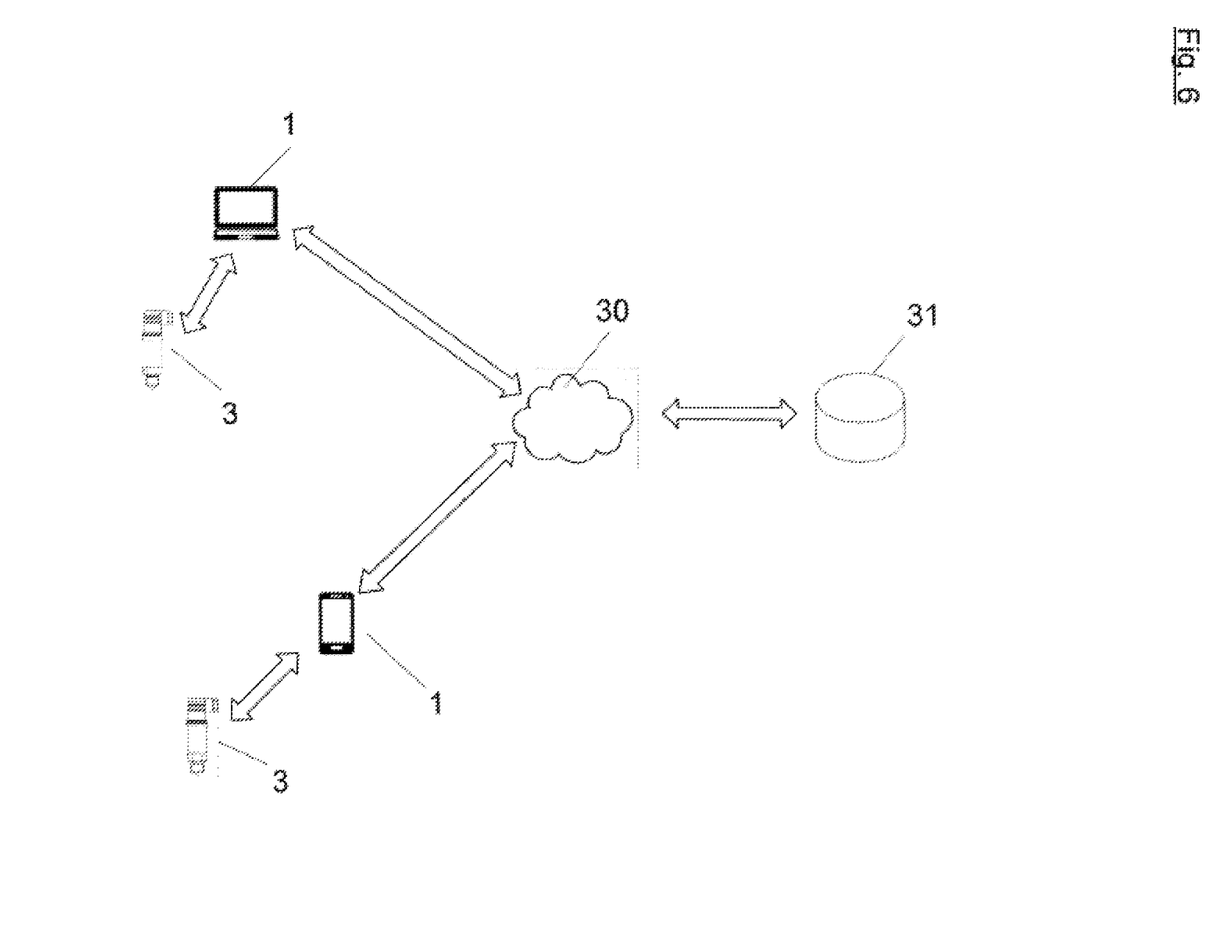
FIG. 6 is a line drawing evidencing a network arrangement in which the method of the present invention can be used advantageously.

The message described here allows now that in further processing programs or a central data collection, as shown in FIG. 6, all time stamps regarding data detected by the field device 3 are comparable, regardless if the data were collected autonomously in the field device 3 or if they were cyclically uploaded via any user program. Here, it is no longer relevant if the device-internal timer 12 shows any time delay. The comparability is also given when the data of various field devices 3 are to be compared with each other. The only framework condition to be fulfilled is here that the time of the control unit 1 is correct.

FIG. 6 shows, schematically, a network with several field devices 3 being scanned, shown respectively with a control unit 1, in the present case a mobile phone and a laptop are displayed. The control units 1 are in turn connected via a local network 30 or the internet to a server 31 for recording the data collected. Thanks to the above-described method, the data of various field devices 3 can be compared with each other, regardless of any precise time-keeping of the respective internal timers 12.

Figure 7:
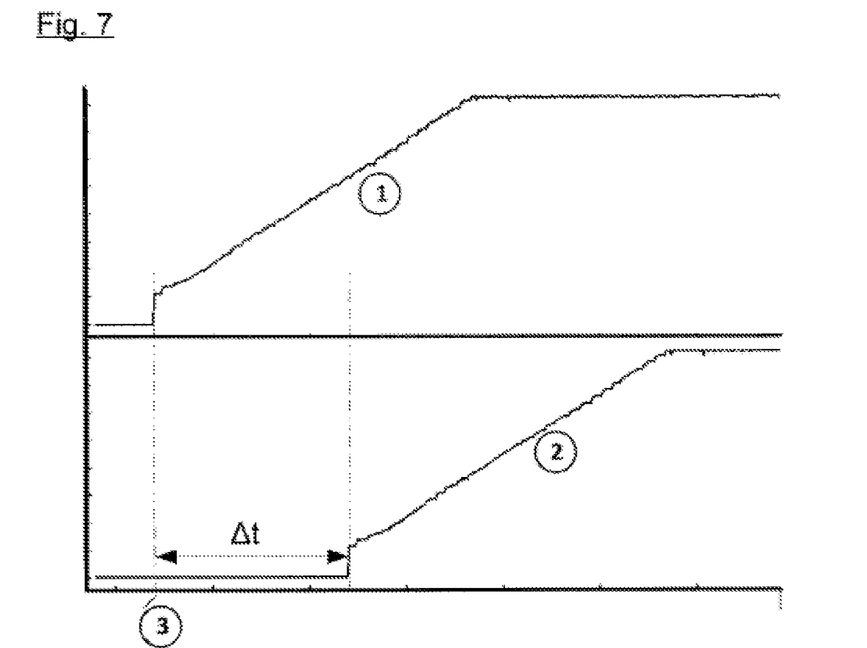
FIG. 7 is a line drawing evidencing the difference between conventional detection of data of a field device and one performed according to the method of the present invention.

FIG. 7 shows, as an example, the case in which the device-internal timer 12 is "late" by a few minutes in reference to the actual applicable time, thus the internal time stamp shows a negative path difference.

Here, the measurement progressions are shown for not compensated data from the measurement memory 13 of the field device 3 (parameter (1)) for data from the measurement detection 10 (characteristic (2)) as well as not compensated data from the parameter change memory 16 (marking (3)). The identical results are shown, which were one time recorded directly (characteristic (2)) and another time they were taken from the measurement memory 13. Due to the fact that the internal timer 12 in reference to the actually applicable time, which is indicated by the timer of the control units 3, (sic), the path difference Δt develops, as shown in FIG. 8, which is compensated by the present method.

| ① | Data from the measurement memory of the field device | without compensation |
| ② | Data from the measurement recording of the field device | without compensation |
| ③ | Data from the parameter change memory of the field device | without compensation |

Figure 8:
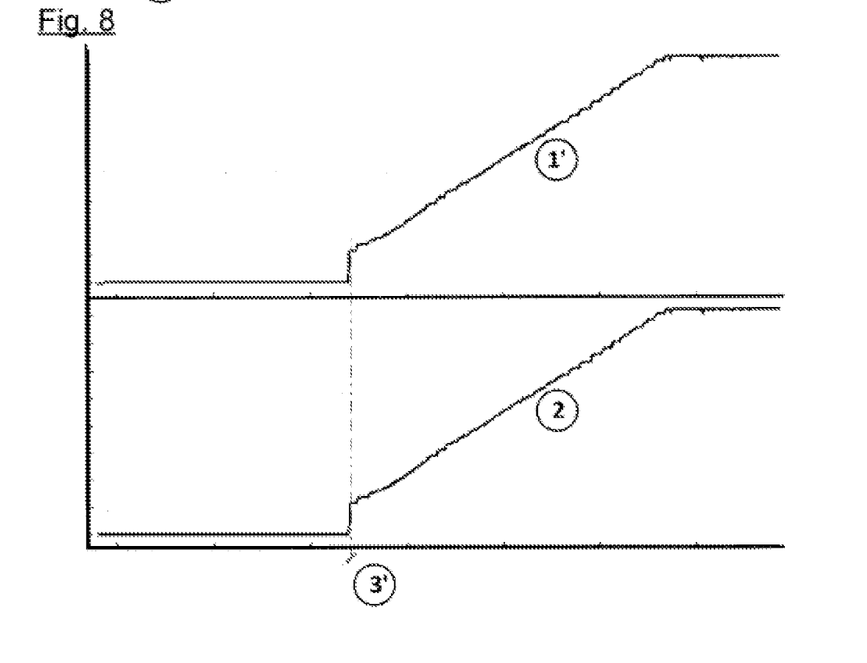

FIG. 8 shows the result after the compensation was performed. The time stamp for the data gathered from the measurement memory 13 and the parameter change memory 16 is corrected according to the present method such that now no path difference Δt is given any longer between the data directly taken from the measurement detection 10 and those from the measurement memory 13.

| ① | Data from the measurement memory of the field device | with compensation |
| ② | Data from the measurement detection of the field device | with compensation |
| ③ | Data from the parameter change memory of the field device | with compensation |

Due to the compensation of the path difference Δt, the data are shown with a corrected time stamp and thus they can be compared to the data of other field devices 3.

LIST OF REFERENCE CHARACTERS

1 Control unit
2 Communication interface
3 Field device
4 Field bus
5 Gateway
10 Measurement detection
11 Measurement collection unit
12 internal timer
13 Measurement memory
14 Device parameter
15 Parameter change collection unit
16 Parameter change memory
17 Device parametrization
30 Network
31 Server
Δt Path difference

We claim:

1. A method for the time-synchronized processing of data of a field device of process automation, in which the data and/or data changes are saved together with an internal time stamp of an internal timer of the field device in a memory of the field device, wherein when reading the data from the field device a path difference is detected between the internal timer of the field device and a timer of a control unit, by which the data are read, the internal time stamp is corrected by the path difference, and saved as a corrected time stamp with said data, wherein measurements and/or parameter changes and/or diagnostics information are saved with the internal time stamp in the memory of the field device.

2. The method according to claim 1, wherein the control unit reads the data via cyclical inquiries.

3. The method according to claim 1, wherein the control unit saves the data together with the time stamp in a database.

4. The method according to claim 1, wherein the time stamp is converted by the control unit to the universal time coordinated.

5. The method according to claim 1, wherein the data is forwarded by the reading device via a network to a further processing system.

6. The method according to claim 5, wherein the further processing system represents a server, particularly a database server, on which the data are saved for further processing.

\* \* \* \* \*